July 3, 1962
G. E. FRANCK
3,041,723
TUBE CUTTER
Filed Sept. 16, 1959
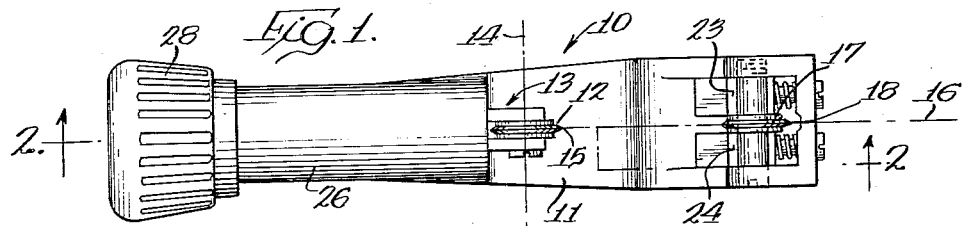

3,041,723
TUBE CUTTER
George E. Franck, Riverside, Ill., assignor to Imperial-Eastman Corporation, a corporation of Illinois
Filed Sept. 16, 1959, Ser. No. 840,394
4 Claims. (Cl. 30—102)

This invention relates to tube cutters and in particular to tube cutters adapted to cut tubing by forcing cutting elements into the outer wall surface of the tube while moving the elements circumferentially therearound.

A conventional form of manually operable tube cutter includes a plurality of wheels having peripheral tube cutting edges and means for mounting the wheels to align each of the edges in a common cutting plane. A well-known form of such a tube cutter is provided with three such wheels, one of which is movable generally toward and from the other two wheels to effect engagement of the wheels with the outer surface of the tube to be cut at three circumferentially spaced points. By rotating the tool about the tube axis while forcibly engaging the cutting edges of the wheels with the tube wall, a cutting of the tube generally transversely to its axis is effected. However, it has been found that a slight skewing of the cutting plane defined by the cutting wheels from a perpendicular relationship to the tube axis may occur during such a tube cutting operation resulting in an undesirable thread-like configuration in the tube outer wall surface.

The principal object of this invention is to provide a new and improved tube cutter for effecting the cutting of a tube in a plane accurately perpendicular to the axis of the tube.

Another object is to provide such a tube cutter including means for maintaining accurately a perpendicular relationship between the axis of the tube to be cut and the plane of the cutting wheel edges.

A further object is to provide such a tube cutter wherein the means comprises a block carried on the body of the tube cutter having a face movable alternatively inwardly to and outwardly from a circle defined by the mutually closest portions of the edges of the respective cutting wheels, said face confronting one wheel and extending perpendicular to the plane of the cutting wheel edges to engage, adjacent a second wheel, the tube to be cut.

Still another object is to provide such a tube cutter wherein a pair of such blocks is provided, the blocks being juxtaposed respectively to opposite sides of the second wheel.

A further object is to provide such a tube cutter wherein the blocks slidably engage opposite sides of the second wheel to maintain the cutting edge thereof in the cutting plane.

Other features and advantages of the invention will be apparent from the following description, taken in connection with the accompanying drawing wherein:

FIG. 1 is a view of a tube cutter embodying the invention;

FIG. 2 is a longitudinal section taken substantially along the line 2—2 of FIG. 1;

FIG. 3 is a fragmentary section similar to that of FIG. 2 but with a tube disposed therein in a cutting disposition;

FIG. 4 is a transverse section taken substantially along the line 4—4 of FIG. 2; and FIG. 5 is an enlarged fragmentary section taken substantially along the line 5—5 of FIG. 2.

In the exemplary embodiment of the invention, as disclosed in the drawing, a tube cutter generally designated 10 comprises a body 11, a first cutter wheel 12, means generally designated 13 for mounting wheel 12 on body 11 for rotational movement about a transversely displaceable axis 14 with the peripheral cutting edge 15 of wheel 12 disposed in a single cutting plane 16. A second cutter wheel 17 having a peripheral cutting edge 18 in plane 16 is rotationally mounted on a shaft 19 extending axially parallel to axis 14, and a third cutter wheel 20 having a peripheral cutting edge 21 disposed in cutting plane 16 is rotationally mounted on a shaft 22 extending axially parallel to shaft 19 and axis 14.

As indicated briefly above, the invention comprehends the provision in such a tube cutter of means for maintaining a true perpendicular relationship between the axis of a tube T and cutting plane 16 during a tube cutting operation. These means include a pair of blocks 23 and 24 formed of a plastic such as nylon and carried on body 11 for movement alternatively toward and away from first cutter wheel 12 and parallel to cutting plane 16. The blocks are substantially identical, each having a face 25 confronting the first cutter wheel 12 and extending parallel to axis 14 to engage the tube T and prevent a skewing of the cutting plane 16 relative to the longitudinal axis of the tube. The blocks 23 and 24 are biased toward a position wherein faces 25 are disposed a small distance in front of cutting edges 18 and 21 of cutter wheels 17 and 20 respectively (toward first cutter wheel 12 as seen in FIG. 2). Thus, faces 25 are disposed within the circle C defined by the mutually closest points of the three wheels. As the wheel 12 is advanced by means 13, the circle defined by said points becomes congruent with the circumference of the tube T and the blocks are urged outwardly thereby to have their faces tangent thereto. As the cutting edges 18 and 21 bite into the wall of the tube T, the blocks are urged farther outwardly by the tube wall, however, at all times the faces maintain the desired perpendicular relationship of the tube to the cutting plane.

More specifically, body 11 comprises a rigid U-shaped member provided with a shank portion 26 having a bore 27. The mounting means 13 extends through bore 27 and is provided with an operating handle 28 for effecting forcible movement of cutter wheel 12 transversely to axis 14. The structure of mounting means 13 is shown and described in detail in my Patent 2,629,926 issued March 3, 1953 for a Cutting Tool. A reamer structure 29 is carried on body 11, the details of which reamer structure are also set forth in my Patent 2,629,926.

Referring now more specifically to FIGS. 3 through 5, body 11 is seen to include an end portion 30 opposite shank portion 26 defined by a pair of spaced side walls 31 and 32 and an end wall 33. Side wall 31 is provided with a pair of threaded holes 34 and side wall 32 is provided with a corresponding pair of unthreaded holes 35. Shafts 19 and 22 extend through holes 35 and are secured to wall 31 in threaded holes 34 in accurate parallel relationship with axis 14 of cutter wheel 12. Cutter wheel 17 is freely rotatably mounted on the mid-portion of shaft 19 and cutter wheel 20 is freely rotatably mounted on the mid-portion of shaft 22.

As blocks 23 and 24 are substantially identical, the following description of block 24 is equally pertinent to block 23. More specifically, block 24 comprises a generally Y-shaped member having a base portion 36 and angularly diverging arms 37 and 38. Tube engaging face 25 is defined by a planar surface 39 on arm 37 and a corresponding planar surface 40 on arm 38, surfaces 39 and 40 extending angularly to each other from a line of intersection 41 extending parallel to axis 14 and intermediate shafts 19 and 22. Thus, tube T has a line engagement with surface 39 and a line engagement with surface 40 such as to align the longitudinal center line of the tube with axis 14 and line of intersection 41.

Block 24 is urged toward cutter wheel 12 by a coil spring 42 concentrically surrounding a fillister head machine screw 43 extending through a bore 44 in body end wall 33 parallel to cutting plane 16. The screw has free movement through bore 44 and is secured at its inner end 45 to block 24 in a threaded recess 46 therein. Coil spring 42 extends between end wall 33 and block 24 and urges the block toward cutter wheel 12 until head 47 of screw 43 abuts the outer surface of end wall 33. In this position, as best seen in FIG. 2, surface 39 is disposed slightly beyond the cutting edge 18 of second cutter wheel 17 and surface 40 is disposed slightly beyond the cutting edge 21 of cutter wheel 20 (i.e., within the circle C). However, as cutter wheel 12 is advanced toward wheels 17 and 20, the tube T is forced against block face 25 to urge the block toward end wall 33 against the action of spring 42 and permit the cutting edge of the cutter wheels to cut into the outer surface of the tube. The perpendicularity of surfaces 39 and 40 to cutting plane 16 is maintained by sliding engagement of the side surface 48 of block 24 with the inner side surface 49 of side wall 32. The disposition of cutting edges 18 and 21 of cutter wheels 17 and 20 respectively accurately in cutting plane 16 is maintained by the abutment of inner side surface 50 of cutter block 24 with side surface 51 of the cutter wheels, and the abutment of inner surface 52 of block 23 with the opposite side surface 53 of the cutter wheels. The transverse dimensions of the blocks 23 and 24 and of the cutter wheels 17 and 20 are correlated so that an accurate fit of these three elements between side walls 31 and 32 of the body is obtained while yet free rotative movement of the cutter wheels on shafts 19 and 22 and free movement of the blocks 23 and 24 with the tube T is obtained.

The blocks are further retained against undesirable transverse movement by making the extent of base portion 36 between shafts 19 and 22 accurately equal to the spacing therebetween. The outer surfaces of arms 37 and 38 may be provided with outwardly opening semicylindrical recesses 58 accommodating the shafts 19 and 22 therein at the extreme movement of the blocks toward end wall 33.

Tube cutter 10 is utilized in a substantially conventional manner by inserting the tube T to be cut laterally into the space between the cutter wheels and advancing the cutter wheel 12 by suitable manipulation of handle 28 to engage the tube forcibly with the cutting edges of the three cutting wheels. In moving to this position, the tube T urges the blocks 23 and 24 to a retracted position relative to cutter wheels 17 and 20 permitting the cutting edges thereof to engage the outer wall surface of the tube. However, faces 25 of the blocks 23 and 24 confronting the tube T dispose the tube in accurate perpendicular relationship with the cutting plane 16 and, thus, parallel to the axes of the cutter wheels. The cutting operation may now be effected by rotating the tube cutter 10 circumferentially about the tube T while concurrently advancing the cutter wheel 12 by suitable manipulation of handle 28. Blocks 23 and 24 assure a maintenance of the cutter wheel cutting edges in the single annular groove in tube T formed by the cutting wheels in cutting plane 16.

Upon completion of the cutting operation, the cutter wheel 12 is retracted from the cutting position by suitable reverse manipulation of handle 28 to arrange the tool for a subsequent tube cutting operation.

While I have shown and described one embodiment of my invention, it is to be understood that it is capable of many modifications. Changes, therefore, in the construction and arrangement may be made without departing from the spirit and scope of the invention as defined in the appended claims.

I claim:

1. In a tube cutter having a U-shaped body including a handle shank portion extending from one end of the U-shaped body, a first wheel having a tube cutting, peripheral edge, means mounting said wheel on said body adjacent said shank portion thereof for rotational movement about an axis, a second wheel having a tube cutting, peripheral edge, a third wheel having a tube cutting, peripheral edge, and a pair of parallel, axially spaced shafts mounting said second and third wheels respectively on the other end of the U-shaped body for rotational movement about parallel axes accurately parallel to and equidistant from the axis of said first wheel and with said cutting edges of the second and third wheels lying in a single cutting plane with said first wheel cutting edge, tube guiding means comprising: a pair of blocks carried on said other end of the body one each on opposite sides of said cutting plane and adjacent to said second and third wheels for movement alternatively toward and away from said axis of the first wheel, said blocks each having a base portion fitted between said shafts, said base portion having opposite parallel faces slidably engaging said shafts for precluding movement of the blocks in the direction of a line perpendicular to the axes of said shafts, said blocks each further having a face confronting said axis of the first wheel including a pair of substantially planar surfaces extending angularly to each other from a line of intersection extending parallel to said axes and being in the plane of the first wheel axis which bisects the space between the second and third wheel axes to engage along a pair of circumferentially spaced lines a tube extending transversely between said wheels thereby to align the longitudinal center line of the tube with said first wheel axis and said line of intersection; and spring means urging the blocks toward said axis of the first wheel with a force sufficient to cause said blocks to maintain said alignment of the tube.

2. The tube cutter of claim 1 wherein said blocks are formed of a plastic material having a low coefficient of friction.

3. The tube cutter of claim 1 wherein each of said blocks further includes a pair of outwardly opening recesses providing clearance with said shafts at the outermost movement of the blocks.

4. The tube cutter of claim 1 including an element extending from each block base portion slidably through said body in a direction parallel to said cutting plane and perpendicular to the plane containing the axes of said shafts.

References Cited in the file of this patent

UNITED STATES PATENTS

| | | |
|---|---|---|
| 660,584 | Norman | Oct. 30, 1900 |
| 1,435,467 | Harman | Nov. 14, 1922 |
| 1,727,406 | Nelson | Sept. 10, 1929 |
| 1,897,374 | Goebel | Feb. 14, 1933 |
| 2,005,163 | Petersen | June 18, 1935 |